United States Patent Office 3,256,374
Patented June 14, 1966

3,256,374
METHOD OF MOLDING FINELY DIVIDED
PARTICLES BY RESIN
Shigemasa Suzuki, Kawaguchi-shi, Saitama-ken, Japan,
assignor to Nippon Ekika Seikei Kabushiki Kaisha,
Tokyo, Japan, a corporation of Japan
Filed Dec. 26, 1962, Ser. No. 247,277
Claims priority, application Japan, Dec. 26, 1961,
36/46,787
13 Claims. (Cl. 264—109)

This invention relates to a method of molding finely divided particles with a resin and an organic solvent and the molding produced thereby.

Heretofore, when molding is carried out be mixing finely divided particles with a resin, the finely divided particles, used as extenders, have been employed in an amount up to about 20 parts by weight to about 100 parts by weight of the resin and, when using a special mixing method, it is possible to mix said particles in an amount up to about 100–120 parts by weight. Japanese Patent No. 293,929 (patent application publication No. 5,544/1961) describes a process for manufacturing fireproof film or sheet of vinyl chloride or vinylidene chloride added with finely divided particles in an amount of 10–60% by weight of the whole. Even in this process, the finely divided particles are mixed in an amount below 150 parts by weight per 100 parts by weight of the resin. The reason why the finely divided particles cannot be mixed in excess of the aforesaid amount is because it is impossible to fill and make homogeneous the entire void among the granules of the finely divided particles with the resin. If the finely divided particles are mixed in excess of the aforesaid amount, an extremely coarse and brittle molding is formed.

This invention relates to a molding method which comprises melting and uniting inexpensive and easily obtainable finely divided particles inside a molding by heat fusion of a thermoplastic resin so that the finely divided particles are exposed on the surface of the molding.

The first object of this invention is to provide a molding method which comprises uniformly mixing 100 parts by weight of a thermoplastic resin, more than 150 parts by weight of an organic solvent, and more than 150 parts by weight of finely divided particles; said organic solvent being easily or swiftly evaporating at a temperature near the melting temperature of said mixture and swellable to said resin at a temperature nearly 50° C. below the melting temperature of said mixture; said particles being thermally stable at the melting point of said resin, insoluble to said solvent, and finer than 150 mesh. The resulting mixture is molded into a soft molding containing the said resin, organic solvent and finely divided particles, and is heated gradually up to a temperature near the melting temperature of said mixture to evaporate the organic solvent, thereby melting and uniting the said resin inside the molding so that the finely divided particles are exposed on the surface of the molding.

The second object of this invention is to provide a method of molding a product whose surface is made hygroscopic and adsorptive by using hygroscopic and adsorptive finely divided particles. The third object of this invention is to provide a molding which is made heat-keeping by using heat-keeping finely divided particles. A further object of this invention is to provide a molding obtained by making spacious the void among the granules of the finely divided particles and imparting porosity and gas permeability to the resin. Another object of this invention is to provide a molding in which finely divided particles are mixed as extenders. The method and molding of the present invention may employ ordinary molding techniques, as for example, case extruder, roll, calender, and press molding a known method wherein extremely soft sheet or film is obtained by streaming and dipping the material on an endless belt as well as molding methods other than these, may also be used.

The molding of the present invention may be generally Numeral 1 indicates an organic solvent having swollen terial, building material and textile product. These and other advantages of the invention will be better understood by referring to the accompanying drawing, taken in conjunction with the following description.

Numeral 1 indicates an organic solvent having swollen or dissolved resin therein; numeral 2 illustrates fine particles (containing a solvent); numeral 2′ illustrates fine particles (with the solvent evaporated); numeral 4 illustrates resin and numeral 5 illustrates a void.

Figure 1:
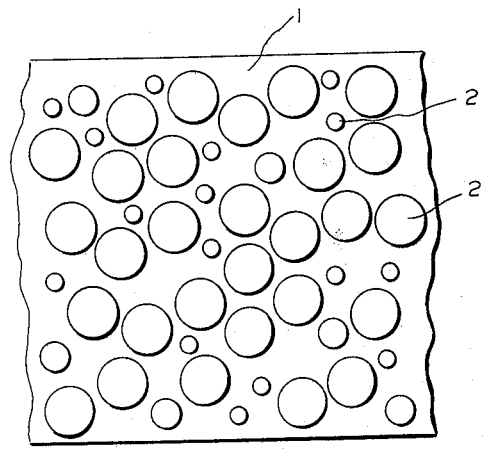
FIG. 1 is a sectional view illustrating a soft moulded sheet.
Figure 2:
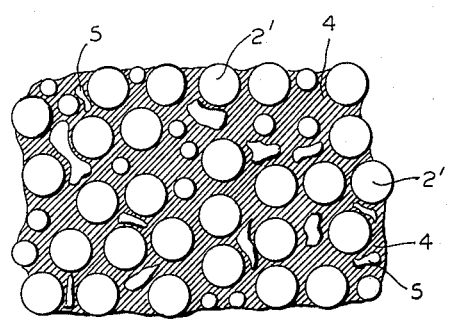
FIG. 2 is a schematic sectional view illustrating the composition of the sheet of FIG. 1 from which the solvent has been evaporated.

As mentioned above, the method of this invention comprises mixing uniformly 100 parts by weight of thermoplastic resin (hereinafter the mixing amount will be expressed in weight ratio based on 100 parts by weight of resin as basic blend), 150–500 parts by weight of an organic solvent and 150–500 parts by weight of finely divided particles, molding the resulting mixture into a soft molding (FIG. 1) containing the said resin, organic solvent and finely divided particles said molding consisting of the organic solvent 1 having swollen or dissolved the resin, and the particles 2, heating said molding gradually up to a temperature near the melting temperature of said mixture to evaporate said organic solvent, thereby melting and uniting the resin inside the molding so that said finely divided particles may come out on the surface of said molding. For the purpose of molding, an organic solvent which evaporates easily or swiftly at a temperature near the melting temperature of the mixture and is swellable to said resin at a temperature nearly 50° C. below the said melting temperature, is selected. Examples of such solvents are, solvent naphtha, α, β mixture-methyl naphthalene, diacetone alcohol, and cyclohexanone. The finely divided particles are required to be thermally stable at the melting point of said resin, insoluble to said organic solvent and finer than 150 mesh. Examples of such compounds are, calcium carbonate, diatom earth, natural or synthetic fibers, porcelain clay.

This invention consists in molding by mixing a large amount, 150–500 parts by weight, preferably up to 300 parts by weight of finely divided particles to 100 parts by weight of resin. Such a method has not hitherto been practised. In existing molding methods, wherein, finely divided particles are used as extenders, it is impossible to fill and make homogeneous the entire void among the granules of finely divided particles in more amount than that of resin with resin, and if excess of the finely divided particles is used in the known methods, the result would be either a brittle molding whose void among granules is either very coarsely or partly united by resin or an impossibility to compose a molding at all.

In this invention, because a large amount, 150–500 parts by weight (in volume, 225–750 capacity) of an organic solvent is mixed and the mixed organic solvent swells or dissolves the resin at a temperature about 50° C. below the melting temperature of the mixture, i.e., above 110° C., it is possible to make an extremely soft, homogeneous molding by heating to about 110–145° C. and mixing in accordance with the existing molding method as mentioned above.

When the surfaces of the soft molding produced by a method of the instant invention are dried, the finely divided particles 2 do not change by the evaporation of the organic solvent having swollen or dissolved the resin and of the organic solvent contained in the finely divided particles, but the resin 4 flows down among the void among the granules of the finely divided particles 2' while reducing itself by the amount of evaporating organic solvent. Thereby the surface of the molding consists of the granules of the finely divided particles and the void 5 among the granules. According to the kind of resin used, extremely thin films may remain on the surfaces of some granules of the finely divided particles.

When the drying is further continued, because the organic solvent has evaporated and the viscosity approaches the thermal melt viscosity of the resin only, the surface of the molding consists of the granules of the finely divided particles and the void among said granules. The finely divided particles are melted and united inside the composition by the resin.

Further, when one surface of the soft molding produced by a present method is dried while being adhered to a metal, coated surface, glass, earthenware, etc., the surface that is dried consists of the granules of the finely divided particles and the void among the granules thereof as mentioned above while the other surfaces may consist of the finely divided particles in a resin film. In this case, only when the blend of the finely divided particles exceeds 150 parts by weight on the surface where the granules of the finely divided particles expose in the resin film also, the characteristic of the finely divided particles will be developed.

For producing an extremely soft molding, operations will be easier when one surface is dried to some extent and then two surfaces are dried.

In a product obtained by a method mentioned above, the characteristic of the finely divided particle is developed in the surface of a molding and it is possible to obtain products for various uses according to the kind of the finely divided particles. For instance, on account of hygroscopic and adsorptive properties of the finely divided particles and the void among the granules, it is possible to print, use typewriter, ink, pencil, crayon, etc. on a molding as on the existing pulp paper. Further, a molding can be used in lieu of the existing textile product by enlarging the void among the granules of the finely divided particles by increasing the amount of mixing organic solvent in order to increase the heat keeping property and by securing the heat keeping property and gas permeability by imparting porosity and gas permeability to the resin film. By properly selecting the resin and the finely divided particles, it is also possible to obtain building material for tile and wall material.

An explanation will be made about the substances used in this invention.

As mixing resins, thermoplastic resins in general containing vinyl resins such as vinyl chloride (hereinafter referred to as P.V.C.), vinyl acetate (hereinafter referred to as P.V.Ac.), polyvinyl alcohol (hereinafter referred to as P.V.A.), natural and synthetic rubber, high-, medium-, low-pressure polyethylene (hereinafter referred to as P.E.), polypropylene (hereinafter referred to as P.P.), polymetha acrylate (hereinafter referred to as P.M.A.), the copolymers thereof, the low polymers of those resins and what is polymer blended with compatible resins, are used. Agents such as plasticizers, stabilizers and coloring agent, and other known on the market may be mixed and used by ordinary methods. The scope of mixing amounts of those mixing substances will be explained with reference to P.V.C.

The blending scope will be: 100 parts by weight of P.V.C. (in this case, even if P.V.C. is a copolymer of predominant P.V.C. or rubbers such as chloroprene rubber, chlorosulfonic ethylene, chlorinated rubber, S.B.R. and N.B.R. or low polymer of P.V.C. or a polymer blend of low polymers of other resins, the following scopes of blending amounts do not change greatly), 0–60 parts by weight of plasticizer, 1–5 parts by weight of stabilizer, 0–20 parts by weight of coloring agent, 150–500 parts by weight of finely divided particles, 150–500 parts by weight of organic solvent and proper parts by weight of what imparts gas permeability such as foaming agent. This blending scope is about same even when other resins are made predominant.

As a mixing organic solvent, a substance meeting the requirements of being able to be mixed with the finely divided particles, the thermoplastic resin and the mixture thereof, of not or hardly dissolving or swelling the resin and not causing physical change such as viscosity for 50 hours after being mixed at a temperature below 20° C., of not hardly imparting compatibility, transformation, degeneration, etc. to the finely divided particles at a temperature below 250° C., of having physical property of easily or swiftly evaporating at a temperature near the thermal melting point of the mixing resin, namely, is a liquid whose boiling point being within the range of 140–250° C., of easily or swiftly evaporating within the range of 140–180° C. when its boiling point being above 160° C., of being swellable, if slightly, or having the minimum solubility to the resin at a temperature above about 110° C. which is about 50° C. below the boiling point of the resin, and being easily evaporating and recoverable, is used. Namely, toward vinyl resins such as P.V.C., P.V.Ac. and P.V.A., either solvent naphtha No. 1, No. 2, No. 3 or $\alpha$, $\beta$ mixture-methyl naphthalene will be used singly or optionally a mixture thereof with diacetone alcohol or cyclohexanone predominantly of the former will be used, and when the resin is natural or synthetic rubber, xylene may be mixed besides the above. Toward olefines such as P.E. and P.P., a mixture comprising about 50% of solvent naphtha No. 3, 40% of $\alpha$, $\beta$ mixture-methyl naphthalene and the remaining part of alcohol benzene, nitrobenzene, dichlorobenzene or cyclohexanone will be used. Toward polystyrene (hereinafter referred to as P.S.), a mixture predominantly of mixed xylene or solvent naphtha No. 1, No. 2 with tetra-hydro-furfural, tetra-hydronaphthalene, triethyleneglycol ethyletheracetate, etc. will be used. Toward P.M.A., a mixture predominantly of $\alpha$, $\beta$ mixture-methyl naphthalene with decahydro-naphthalene, diethylene glycol, butyroether acetate, cyclohexanone, etc. may be used. These organic solvents may be used as they are when the resin is a copolymer of resins or a ploymer blend.

Further, when the molding to be produced is desired to have porosity and gas permeability, the porosity and the gas permeability can be achieved by foaming the material after the drying step with a foaming agent which foams at a temperature above 180° C. and is stable at a temperature below 180° C., or by mixing at the time of blending, a substance which is unlimitedly and easily soluble to water, for instance, tetraethylene glycol, diethyl ether, polyoxyethyleneoleylether, alkyl ether, polyethylene glycol monostearate and oily and creamy material such as other ester of fatty acid, in accordance with the method of Japanese Patent No. 284,772 (U.S. Patent No. 2,950,504), and by removing the same by washing with water after the drying operation.

As mixing finely divided particles, a substance having hygroscopic and adsorptive property and properties of being able to be pulverized to 150–500 mesh, of being able to be easily dried, of being able to be uniformly mixed with a mixing organic solvent, of being stable to heating to a temperature below the boiling point of said organic solvent, for instance, below 250° C., of not or hardly changing physically and chemically, of being affined to said organic solvent or containing the same and of easily adhering to the thermoplastic resin when it is heated and melted and meeting the requirement of being inexpensive and being able to be mass produced industrially, will be selected. Namely, such substances are calcium carbonate, titanium white, strongly plasticizing clay and diatom earth predominantly of hydrous alumina crystal whose granules are less than 0.01 mm. and fibrous material which can be pulverized into granules whose diameter is below 0.1 mm. which meets the above requirements. For instance, animal and vegetable natural fibers such as bamboo, straw, pulp, reed, weeds, felt, cotton, etc. and synthetic fibers will be used after being approached to pure fibrous material by being decolored, dehydrated and bleached and thereafter being sufficiently dried.

It is known to mix calcium carbonate, titanium white, chalk, clay, etc. of the using finely divided particles with P.V.C., etc. to use as filler, however, the mixing amount thereof is ordinarily 20 parts by weight and up to 150 parts by weight by using a special apparatus and method as mentioned above, and mixing in excess of such amount would, as mentioned above, lead to difficulty of molding. It is apparent upon seeing the products on the present market that when they are used as filler, when the amount thereof is below 150 parts by weight, the filler will be completely filled in P.V.C. and the filler will not or hardly come out on the surface of the product. Although this invention uses finely divided particles containing known filler, that the using amount thereof is 150 plus–500 parts by weight is not seen in the existing products and arts and because the composed surface of a molding is so molded as to be consisted of the granules of the finely divided particles and the void among said granules so that the characteristic of the granules of the finely divided particles may be developed on the surface and the resin unites the granules of the finely divided particles inside the composition, the blending amount, the purpose of use, the structure of a molding and the composing method thereof are fundamentally different from those of known fillers.

In order to recover the organic solvent while a molding is in the process of being molded, because the solvent is a substance whose boiling point is more than 140° C., it can be sufficiently cooled by indirect cooling with water, therefore the recovery of more than 90% thereof is possible by a simple equipment. A porous and gas permeable substance is recovered after removing by washing with water separation by salting out, etc.

When the manufacture of a molding of this invention is explained with the reference to examples using P.V.C.:

*Example 1*

An example of manufacturing sheet which can be used same as the existing pulp paper by using an extruder.

Parts by weight

Resin—Blend of 85% of P.V.C. whose average degree of polymerization is 1,400 and 15% of chloroprene rubber _____ 100
Plasticizer—Dioctyl phthalate (D.O.P.) _____ 18
Coloring agent—Titanium white _____ 5
Stabilizer—Di-butyl-tin laurate _____ 1
Finely divided particles:
  Calcium carbonate 200–250 mesh _____ 220
  Bamboo fiber whose diameter is below 0.02 mm. and length is below 1 mm. _____ 20
Organic solvent—Solvent naphtha No. 2: 40%, α, β mixture-methyl naphthalene: 55%, diacetone alcohol : 5% _____ 160

When the above materials were uniformly mixed by a blender, a viscous fluid blend was obtained. Said blend was pushed in from the hopper of an extruder equipped with a T-shape die opening (said blend was) heated from 110° C. to 145° C. until it reached the die opening and extruded, the extruded and produced soft sheet was transferred onto a net belt, while said sheet together with said net belt passed through a drying furnace, the organic solvent was evaporated, when said sheet was passed between rolls at the later drying, sheet whose both surfaces were consisted of the granules of calcium carbonate, the granules of bamboo fiber and the void among the granules thereof and whose inside was melted to adhere and united by P.V.C. and polychloroprene was obtained. When the organic solvent completely evaporated, sheet was heated to 180–230° C. for a short period, then taken out from the drying furnace, and was cooled and wound up, sheet was obtained continuously. This sheet was very good for the printing by ink for pulp paper, the use of ordinary ink and crayon and could be used same as the existing pulp paper and had excellent waterproof, antimedicine and fireproof properties. Even when the using resin is single, a copolymer or other blends and the finely divided particles are the simple substance of themselves or a mixture with clay, etc., the above method does not change.

Also in this case, immediately after being produced from the extruder, when one surface of sheet was adhered to the surface of a polished metal endless belt and was dried, sheet whose one surface exposed many granules of calcium carbonate and bamboo fiber in the film of P.V.C. and polychloroprene could be obtained. Although said surface was slightly inferior in printing and adherence to ink, crayon, etc., because it had good gloss, it was ideal to be used as a cover of a publication, waterproof paper, etc.

When sheet whose thickness is below 0.1 mm. is to be produced, natural fiber such as bamboo fiber will not be used.

*Example 2*

An example of manufacturing sheet which can be used nearly same as the existing heat keeping textile fabrics by directly streaming the material onto an endless belt.

Parts by weight

Resin—Copolymer of 80% of P.V.C. and 20% of acrylonitrile _____ 100
Plasticizer:
  Low polymerized nitrile rubber (N.B.R.) mainly containing nitrile _____ 40
  Low copolymer of styrene and methylmetha acrylate _____ 30
Coloring agent—Titanium white: 50% fluorescent pigment: 50% _____ 10
Stabilizer—Dibutyl-tin maleate _____ 1
Finely divided particles:
  Calcium carbonate 150–200 mesh _____ 65
  Flue whose diameter is below 0.03 mm. and length is below 0.5 mm. _____ 160
  P.V.A. fiber whose diameter is below 0.08 mm. and length is below 1.5 mm. _____ 8
Organic solvent—Solvent naphtha No. 2: 45%, solvent naphtha No. 3: 20%, α, β mixture-methyl naphthalene: 30%, cyclohexanone: 5% _____ 410
Porous and gas permeable agent—Poly-200-ethylene-glycol monostearate _____ 30

Of the above, 60% of the organic solvent was gradually mixed with the mixture of the resin, the plasticizer, the coloring agent and the stabilizer while the finely divided particles were mixed with the remaining 40% of the organic solvent. When both of the two mixtures were mixed together and the resulting mixture was rid of foams in vacuum state by being passed through a colloid mill, white turbid liquid of 38–41 centipoise viscosity was obtained. These treatments were carried out at a temperature below 20° C. Said white turbid liquid was adhered to and streamed onto an endless belt having a polished surface of stainless steel or the coating thereof at a belt temperature of 45–143° C., after it was kept at 145° C. inside a heating furnace for 3–15 minutes, it was dried at 150–160° C., then it was removed from the endless belt and passed between rolls, the both surfaces of the resulting sheet were dried, the dried sheet was finally heated to 180–230° C. for a short period and then taken out of the furnace, said sheet was passed through shower of below 30° C. or flowing water so that the porous and gas permeable agent might be removed by washing with water, next, moisture was evaporated in a drying furnace at a temperature below 80° C. and sheet whose surface was consisted of the granules of the aforesaid finely divided particles and the void among the granules thereof and whose resin and plasticizer united the granules of the finely divided particles inside the composed part was obtained. Because this sheet used many organic solvents, the void among the granules of the finely divided particles was spacious and because of what imparted porosity and gas permeability such as, for instance, foaming agent, the resin uniting the granules of the finely divided particles had many or gas permeable openings. Accordingly, a product having superior waterproof property, fireproof property and anti-medicine property to those of the existing textile fabrics used as heat keeping material and adiabatic material was obtained.

*Example 3*

An example of directly manufacturing moldings such as glass and bottle.

| | Parts by weight |
|---|---|
| Resin—P.V.C. whose average degree of polymerization is 1,200 low nitrile rubber (N.B.R.) containing mainly nitrile (30 parts by weight) | 100 |
| Coloring agent—titanium white | 5 |
| Stabilizer—calcium stearate | 3 |
| Finely divided particles—calcium carbonate 150–200 mesh | 160 |
| Organic solvent—solvent naphtha No. 2: 15%, $\alpha, \beta$ mixture-methyl naphthalene: 85% | 260 |

These materials were mixed and rid of foams and the mixture was adhered to a glass-shaped or rod-shaped mold which was somewhat smaller than the object of molding, when the adhered mixture was heated at 140–145° C. for 200–600 seconds, a soft glass-shaped or rod-shaped molding containing almost all the aforementioned blends was produced. This molding was passed as it was through a drying furnace of 130–160° C. and when evaporation was finished or during the process of drying, it was removed from the mold and dried. Then, a molding on whose surface the granules of the finely divided particles had come out was obtained. After a glass-shaped or rod-shaped molding finished drying, while it was being cooled at 80–110° C., either by blowing from the opening of the cooled mold after it was stuck, or, on the contrary, by adsorbing from outside by a vacuum apparatus, said molding was closely pressed onto the mold and cooled and a glass or bottle was obtained as a product.

*Example 4*

An example of manufacturing sheet which can be used same as the existing building material such as tile and wall paper.

| | Parts by weight |
|---|---|
| Resin—P.V.C. whose average degree of polymerization is 1,400 | 100 |
| Coloring agent—pigment | 5 |
| Stabilizer—lead stearate: 80%, cadmium stearate: 20% | 3 |
| Finely divided particles: | |
| Calcium carbonate 100–150 mesh | 220 |
| Clay, finer than 150 mesh | 110 |
| Organic solvent—solvent naphtha: 40% $\alpha, \beta$ mixture-methyl naphthalene: 60% | 185 |

When these materials were uniformly mixed by a blender, a viscous fluid blend was obtained. After that, by the same treatment as in Example 1, hard sheet which could be used as the objective building material was obtained. Often, the product whose one surface was freely dried and the other surface was finished by the metal surface of an endless belt, etc. finds more ways of usage.

As compared with the existing pulp paper, textile products, building materials, etc., the products of this invention obtained in the above-mentioned examples are noncombustible, neither changing nor transforming even when they are immersed in water, waterproof, anti-medicine and fireproof. Concerning a molding which has hitherto been requiring complicated processing, it can be pressed and processed in a vacuum state from sheet, at the same time, can be directly molded according to the method of this invention. For instance, concerning laminated coating which has been imparted to cellophane, paper, etc., it is unnecessary to impart the same to the sheet of this invention to be used as paper. According to the method of this invention, glasses, plates (saucers), containers, bottles, cans, etc. which have hitherto been made of paper, glass or metals can be obtained directly or by press and processing in a vacuum state from sheet. Those products can be easily and inexpensively manufactured by the method of this invention.

I claim:

1. Method of molding comprises mixing uniformly 100 parts by weight of a thermoplastic resin, more than 150 parts but less than 500 parts by weight of an organic solvent and more than 150 parts but less than 500 parts by weight of finely divided particles finer than 150 mesh, the said organic solvent being evaporable at a temperature near the melting point of the said resin and at least capable of swelling said resin at a temperature nearly 50° C. below the melting point of the said resin, the said particles being thermally stable at a temperature near the melting point of said resin, being insoluble in the said solvent and having a hygroscopic and adsorptive property; molding the so obtained mixture into a soft molding containing the said resin, organic solvent and particles; and thereafter heating the said molding gradually up to a temperature near the melting point of the mixture so as to evaporate the organic solvent, whereby the interior of the molding is composed of the particles in the resin which binds the said particles, and wherein the surface thereof is composed of only the said particles and a void between the particles.

2. The molding method of claim 1 wherein the said organic solvent is a solvent naphtha from coal or petroleum.

3. The molding method of claim 1, wherein the said solvent is an $\alpha, \beta$ mixture-methyl naphthalene.

4. The molding method of claim 1, wherein the said finely divided particles are prepared from calcium carbonate.

5. The molding method of claim 1 wherein the said finely divided particles are prepared from clay.

6. The molding method of claim 1 wherein the said finely divided particles are prepared from titanium oxide.

7. The molding method of claim 1 wherein the said thermoplastic resin is an unplasticized polyvinyl chloride.

8. The molding method of claim 1 wherein the said thermoplastic resin is a polyvinyl chloride mixed with up to 60 parts by weight, based on the resin, of a plasticizer.

9. The molding method of claim 1 wherein the said thermoplastic resin in vinyl acetate.

10. The molding method of claim 1 wherein the thermoplastic resin is a natural rubber.

11. The molding method of claim 1 wherein the thermoplastic resin is a synthetic rubber.

12. The molding method of claim 1 wherein the said thermoplastic resin is polyethylene.

13. The molding method of claim 1, wherein the said thermoplastic resin is polypropylene.

References Cited by the Examiner

UNITED STATES PATENTS

| | | | |
|---|---|---|---|
| 2,150,121 | 3/1939 | Kistler | 264—122 |
| 2,806,509 | 9/1957 | Bozzacco et al. | 264—109 XR |
| 2,977,264 | 3/1961 | Shapero et al. | 161—162 |
| 3,001,582 | 9/1961 | Kindseth et al. | 162—411 |
| 3,166,615 | 1/1965 | Farrell | 264—23 |

FOREIGN PATENTS 67,208  7/1948  Denmark.

ALEXANDER H. BRODMERKEL, *Primary Examiner.*

P. E. ANDERSON, *Assistant Examiner.*